United States Patent [19]

Sommer et al.

[11] Patent Number: 4,695,397

[45] Date of Patent: Sep. 22, 1987

[54] GRANULAR BLEACHING ACTIVATOR

[75] Inventors: Karl Sommer, Palzing; Robert Heinz, Mannheim; Albert Hettche, Hessheim; Johannes Perner, Neustadt; Werner Schuster, Boehl-Iggelheim; Wolfgang Trieselt, Ludwigshafen, all of Fed. Rep. of Germany

[73] Assignee: BASF Aktiengesellschaft, Ludwigshafen, Fed. Rep. of Germany

[21] Appl. No.: 907,161

[22] Filed: Sep. 15, 1986

Related U.S. Application Data

[63] Continuation of Ser. No. 772,209, Sep. 5, 1985, abandoned, which is a continuation of Ser. No. 421,098, Sep. 22, 1982, abandoned.

[30] Foreign Application Priority Data

Sep. 28, 1981 [DE] Fed. Rep. of Germany ....... 3138551
Mar. 6, 1982 [DE] Fed. Rep. of Germany ....... 3208216

[51] Int. Cl.⁴ ........................ C09K 3/00; C11D 3/395

[52] U.S. Cl. .................................... 252/182; 252/95; 252/99; 252/102; 252/135; 252/174.17; 252/174.24; 252/174.13; 252/186.38; 252/186.39; 252/546; 264/118; 264/122

[58] Field of Search .................. 252/95, 99, 102, 135, 252/174.17, 174.24, 174.13, 182, 186.38, 186.39, 546; 264/118, 122

[56] References Cited

U.S. PATENT DOCUMENTS

| | | | |
|---|---|---|---|
| 4,372,868 | 2/1983 | Saran et al. | 252/102 |
| 4,422,950 | 12/1983 | Kemper et al. | 252/186.38 |

FOREIGN PATENT DOCUMENTS

| | | |
|---|---|---|
| 0037026 | 7/1981 | European Pat. Off. . |
| 1360427 | 7/1974 | United Kingdom . |
| 2015050 | 9/1979 | United Kingdom . |
| 1573406 | 8/1980 | United Kingdom . |

*Primary Examiner*—John Kight
*Assistant Examiner*—Kriellion S. Morgan
*Attorney, Agent, or Firm*—Oblon, Fisher, Spivak, McClelland, & Maier

[57] ABSTRACT

A granular bleaching activator for use in a detergent or bleach, which has particles which have a size of from 0.5 to 3 mm and are composed of (a) from 70 to 99.5% by weight of one or more bleaching activators for per-compounds and
(b) from 0.5 to 30% by weight of one or more water-swellable assistants and which have been prepared, without use of water, by compacting the components (a) and (b).

2 Claims, No Drawings

GRANULAR BLEACHING ACTIVATOR

This application is a continuation of application Ser. No. 772,209, filed Sept. 5, 1985, now abandoned, which is a continuation of application Ser. No. 421,098, filed Sept. 22, 1982, now abandoned.

The present invention relates to granular bleaching activators, having a particular particle size and intended for use in detergents or bleaches, which activators contain water-swellable substances as assistants, and to a process for the preparation of these activators.

It is known that detergents which contain per-compounds as bleaches are only effective in bleaching at about 100° C., because the per-compounds, mostly sodium perborate, do not decompose at sufficient speed at lower temperatures to be able to participate actively in the bleaching process. Hence, it is conventional practice to employ activators which react with the peroxo group of the per-compounds, to form per-acids, which themselves are active at as low as from 30° to 60° C., ie. at the temperatures required for washing delicate fabrics.

These activators, which include N-acyl and O-acyl compounds, such as anhydrides or acid amides, as well as nitriles (a more precise list is given below) are very sensitive to hydrolysis, especially in the presence of the alkalis conventionally used in detergents. This problem is accentuated by the fact that the activators are often only sparingly soluble in water, which is why they have to be employed in the form of a very fine powder to ensure more rapid dispersion. This fine form, however, by virtue of its greater surface area results in increased hydrolysis of the activators on storage.

The commonest way of screening bleaching activators from moisture is to make up the activator in the form of small particles which are preferably coated with an assistant. Numerous methods of producing such particles, and their use in detergents, are described in the literature.

In the majority of cases, the binder or coating agent used is an organic substance or mixture of organic substances, for example nonionic surfactants, fatty acids, polymeric materials or waxes.

German Laid-Open Application DOS 2,657,042 discloses a cleanser mixture which contains tetraacetylethylenediamine in the form of granular particles. These particles consist, for example, of the said activator and a minor amount of a nonionic surfactant melting at, or above, 35° C.

However, the use of organic substances has the disadvantage that it generally causes handling problems, especially in hot weather, because of the tackiness of the substances, and also has the further disadvantage that it increases the disintegration time of the particles and hence often causes a low rate of dissolution or dispersion.

Inorganic substances have also been employed for the same purpose. For example, British Pat. No. 1,360,427 proposes activator particles which have been produced by granulation using sodium triphosphate, whilst German Laid-Open Application DOS 2,855,777 proposes granular activator particles which are composed of a major proportion of the activator itself and a minor proportion of a hydratable salt mixture comprising sodium triphosphate and another salt. However, such particles also have unsatisfactory properties. Unless they are additionally coated, their shelf life is unsatisfactory, due to hydrolysis. On the other hand, if they are coated, the coating interferes with the requisite rapid dispersibility in the wash liquor. Specifically, the use of water as one of the assistants, and the presence of a residual amount of the water in the activator granules, makes the latter very heat-sensitive and hydrolysis-sensitive. For example, the water present in the crystals is liberated spontaneously on exceeding the transition temperature and causes decomposition of the activator particles, as described on page 7 of German Laid-Open Application DOS 2,855,777. The use of readily water-soluble assistants which are capable of bonding water of hydration is allegedly justified on the ground that only in this way is satisfactory rapid dispersion of the agglomerates achievable under washing conditions.

European Laid-Open Application 0,037,026 describes water-soluble, cellulose ethers, starches and starch ethers as granulating assistants for bleaching activators. As in German Laid-Open Application 2,855,777, water is employed, inter alia, as a granulating assistant and, as in the said DOS, a small amount of the water introduced when producing the granules remains in the latter and thereby immediately cancels out some of the stabilization which the granulation process is intended to achieve.

Every suitable method of compounding a bleaching activator pursues two objectives. First, it seeks to improve the hydrolysis resistance of the activators which, regardless of their specific chemical character, all have an easily hydrolyzable active group which must be protected during storage of the alkaline detergent powder containing the activator. Secondly, any suitable method of protecting the bleaching activator from the environment must permit rapid dispersion of the activator in the wash liquor, ie. the activator must be liberated in a very finely divided form well before the end of the washing cycle if the bleaching action is to be optimized.

It is an object of the present invention to provide, without the use of water or of every highly water-soluble, highly hydratable compounds, agglomerates, composed of particles of size $<300$ μm, which have a very small inner surface area, do not require evaporation of residual water, and in spite of these facts-which have hitherto been regarded as detrimental to good dispersion-disperse spontaneously, in a fine form, in the wash liquor and also, on storage, give substantially better shelf life than that achievable by the prior art.

It is a further object of the present invention to provide a very simple and economical process for the production of the said granular activators, having a macroparticle size which corresponds to the other constituents conventionally used in detergent powders, namely, in general, from 0.5 to 3 mm.

We have found that these objects are achieved by providing granular bleaching activators of a particular composition, and a process for their preparation, as defined in claims 1 to 5, and claim 6, respectively.

The particles in general have a size of from 0.5 to 3 mm, preferably from 0.5 to 2 mm, and are composed of from 70 to 99.5, preferably from 75 to 95, % by weight of a bleaching activator for per-compounds and from 0.5 to 30, preferably from 2.5 to 15, % by weight of one or more water-swellable assistants. Preferably, they additionally contain from 1 to 10, preferably from 2.5 to 10, % by weight of an inorganic or organic builder and/or dispersant; the sum of the percentages must of course always be 100.

Examples of bleaching activators for per-compounds are O- N-acylated compounds, such as pentaacetylglucose (PAG), pentapropionylglucose (PPG), tetraacetylethylenediamine (TAED), tetraacetylglycoluril (TAGU), carboxylic acid anhydrides, such as succinic anhydride, benzoic anhydride or phthalic anhydride, and salts of mixed anhydrides, such as sodium or magnesium diacetyl-phosphate (NADAP and MGDAP), as well as phenol esters, eg. (p-carboxyphenyl acetate, p-sulfonylphenyl acetate, p-cresyl acetate and phenyl acetate.

In contrast to the assistants used in the prior art, the water-swellable assistant according to the invention is a substance which only dissolves slowly, if at all, in water at wash temperatures of up to 70° C., and instead onldy swells, ie. is capable of taking up water whilst undergoing a great increase in volume. This clearly shows the function of the assistant, namely that the granules which consist of a mixture of dust-like micro-particles of the activator and of the assistant are disintegrated under the action of water and hence it is no longer necessary to have present a nonionic surfactant to act as an emulsifier or a readily soluble assistant, with a high binding capacity for water of hydration, to ensure dispersion of the particles.

The swellable assistant, by acting as a disintegrating agent, produces immediate dispersion.

Examples of assistants, for the purposes of the invention, are high molecular weight carbohydrates, such as starch and pulverized cellulose, groundwood, such as is employed in the paper industry, and crosslinked polyvinylpyrrolidone (PVP), which is a conventional tablet disintegrating agent in the pharmaceutical industry. Preferred assistants are starch, crosslinked PVP and starch ethers, for example carboxymethylcellulose.

The builders and/or dispersants which preferably are also present are, for the purpose of the invention, inorganic substances such as sodium sulfate, sodium carbonate or, preferably, alkali metal salts or alkaline earth metal salts of phosphoric acid, oligomeric phosphoric acids or polymeric phosphoric acids, and organic substances such as the alkali metal salts or alkaline earth metal salts of nitrilotriacetic acid, of ethylenediaminetetraacetic acid, of polyacrylic acid or of copolymers of maleic acid with acrylic acid or vinyl ethers, as well as carboxymethylcellulose. The organic acids mentioned can also be employed in the free form. Particularly useful dispersants are sodium nitriloacetate, sodium ethylenediaminetetraacetate, sodium tripolyphosphate, the sodium salts of maleic acid/acrylic acid copolymers, and carboxymethylcellulose (CMC). Mixtures of the said substances can also be employed.

According to the invention, CMC can be employed both as the assistant b and as component c, ie. the bleaching activator may, in addition to the activator substance, contain solely CMC. In that case the amount of CMC is so chosen as to conform to the percentages of component a and b referred to in the definition of the invention, ie. the bleaching activator in that case contains from 1.5 to 30% by weight, preferably from 5 to 25% by weight, of CMC.

The effect of the combination of activator and swellable assistants, with or without builders and/or dispersants, is furthermore surprising because the addition of either acid or alkaline component c produces a marked increase in the shelf life of the compactate. Against this, other investigations show clearly that the hydrolysis of the activators is very greatly accelerated by acid conditions and also especially by alkaline conditions.

The above combination moreover gives a compactate which disperses, without problems, in the washing liquor within a few minutes. The particle size of the dispersed particles is of the same order of magnitude as in the original powder. Surprisingly, the proportion of coarse material even decreases markedly compared to the fine powder employed for compacting.

According to the invention, the granular activator is produced by compacting the mixture of individual components.

The method of pelletizing or pelletizing granulation fails in this instance, since there is no binder present, nor is the water present which is needed, for example, when employing the above phosphates (which are sprayed as an aqueous solution onto the material to be granulated) or when using starch ethers or cellulose ethers.

In detail, the granular activator may be prepared, for example, by first producing a homogeneous mixture, conforming to the definition given, of the assistant, the activator substance and the builder and/or dispersant, each of these substances being in powder form and the activator particles in general having a size of from about 10 to 300 μm, and compacting this mixture. Compacting can be effected by feeding the said power mixture, by means of a feed screw, into the gap between two counter-rotating rolls and compressing it between these rolls. The resulting scabs of material are crushed on a comminuter and the particle size of the product is limited to the desired range, advantageously from 0.5 to 3 mm, on a screening comminuter.

The material with particle sizes outside the desired limits is separated off and returned to the compactor together with fresh mixture to be compacted.

We have found that the resulting granular activator surprisingly has a very good shelf life. This was unexpected since the insoluble and merely water-swellable assistants do not exert any protective function (in the manner of a coating) on the activator substances, in the manner in which protection appears to be effected in the prior art publications. We have found, moreover, that the shelf life is in many cases even better than when a coating agent is used, as revealed by the improved bleaching action of the novel activators, stored for a substantial length of time, when compared to prior art activators stored for an equal period. In fact, the activity can even be increased, by adding component c.

The Examples and test results which follow illustrate the invention in those instances where the bleaching activator consists solely of components a and b.

EXAMPLES

Test of shelf life of the granulator activators

(1) Preparation of the test washing powder 80 parts of a washing powder coming from a spray drying power and still requiring the admixture of perborate are thoroughly mixed with about 10 parts of TAED compactate equivalent to 8 parts of 100% strength TAED. The exact amount of compactate to be used is decided by the TAED content of the compactate.

The test washing powder has the following composition

| | |
|---|---|
| Alkylbenzenesulfonate | 10% |
| $C_{13}/C_{15}$-alkyl glycol ether (9–14% of ethylene oxide) | 3% |
| Sodium tripolyphosphate | 40% |

-continued

| | |
|---|---|
| Magnesium silicate | 4% |
| Carboxymethylcellulose | 2% |
| Sodium perborate tetrahydrate | 10% |
| Cold bleaching activator | 8% |
| $Na_2SO_4$ | x% |

(2) Storage test method 20 to 30 g portions of the washing powder mixture prepared as above are stored in open Petri dishes in a controlled-climate cabinet at 38° C. and 76% relative atmospheric humidity. The bleaching action is determined immediately after mixing, and after 21 and 42 days storage.

The comparative materials are a powder mixture $W_0$ which contains 10 g of $Na_2SO_4$ instead of the compactate (ie. contains no activator) and the same washing powder mixture to which, prior to each bleaching experiment 8% of the compacted activator or of activator granules of the prior art are admixed.

Since the powder $W_0$ is also subjected to storage the slight decomposition of the perborate has no effect on the relative test results, which essentially only indicate the hydrolysis of the activator.

(3) Testing the bleaching action of the test washing powder (a) Test conditions:
- Test apparatus: Launder-Ometer
- Water hardness: 16° German hardness
- Amount of Liquor: 250 ml
- Liquor ratio: 1:12.5
- Detergent concentration: 7 g/liter (b) Test fabrics:
- 10 g of greige cotton nettle (whiteness about 59%)
- 5 g of bleached cotton nettle soiled with red wine (whiteness about 70%)
- 5 g of bleached cotton nettle soiled with tea (whiteness about 54%)

The three different test fabrics, each washed for 30 minutes at room temperature, 30 minutes at 25°–45° C. and 30 minutes at 35°–60° C., are subjected to whiteness measurements, giving 9 values which are summed. As a result of this summing and of duplicate determination, the values obtained have a sufficient degree of reliability.

The whiteness measurements were carried out on an ELREPHO instrument from Zeiss, using Filter 8 and a xenon lamp with FL 46.

The difference in the sums of the whitenesses of $W_{100}$ (see below) and $W_0$, multiplied by 100, is a measure of the activation of the undecomposed activator (100%). The diference in the sums of the whitenesses of $W_x$ and $W_o$, multiplied by 100, is a measure of the residual activity of the powder after storage in percent.

80 g portions of the washing powder coming from the spray-drying tower and 10 parts of sodium perborate were mixed with the activator shown below in an amount such as to give a content of 8 parts of tetraacetylethylenediamine (TAED) in the powder. Any shortfall of additives was made up with $Na_2SO_4$ to give 100 parts.

The symbols have the following meanings:

$W_0$=washing powder without activator (only $Na_2SO_4$)

$W_{100}$=washing powder+crystalline TAED (8%) added before each bleaching test $W_3$=washing powder+8% of TAED, compacted with 5%-based on TAED-of corn starch; particle size 2 mm $W_4$=washing powder $M_3$, TAED compactate additionally coated with 4% of a reaction product of a fatty alcohol with 25 moles of ethylene oxide $W_5$=washing powder $M_3$, TAED compactate additionally coated with 8% of a reaction product of a fatty alcohol with 25 moles of ethylene oxide $W_6$=washing powder+8% of TAED compacted with 5%-based on TAED-of crosslinked polyvinylpyrrolidone $W_7$=washing powder+8% of TAED compacted with 3%-based on TAED-of corn starch; particle size 0.8–1.5 mm $W_8$=washing powder+8% of TAED compacted with 10%-based on TAED-of corn starch $W_9$=washing powder+8% of TAED compacted with 5% of hydroxymethylcellulose $W_{10}$=washing powder+8% of TAED granulated as in Example 1 of German Laid-Open Application DOS 2,855,777

$W_{11}$=washing powder+8% of crystalline non-compacted TAED

The bleaching test results are shown in Table I, which follows.

TABLE I

| Example No. | whiteness measurements: Sum of all immediate | after 3 weeks' storage | after 6 weeks' storage | % activation: immediate | after 3 weeks' storage | after 6 weeks' storage | Rate of dissolution of the corresponding compactate |
|---|---|---|---|---|---|---|---|
| 1 | 615 | 614 | 607 | 0 | 0 | 0 | — |
| 2 | 670 | 665 | 663 | 100 | 100 | 100 | — |
| 3 | 667 | 661 | 654 | 94 | 93 | 84 | Particles disintegrate Immediate disintegration |
| 4 | 666 | 658 | 650 | 93 | 86 | 77 | Disintegration after 8 minutes |
| 5 | 672 | 659 | 652 | (100) | 88 | 80 | Disintegration after 8 minutes |
| 6 | 666 | 660 | 652 | 93 | 90 | 80 | Disintegration after 30 seconds |
| 7 | 666 | 659 | 652 | 93 | 88 | 80 | Disintegration after 3 minutes |
| 8 | 667 | 660 | 654 | 94 | 90 | 84 | Particles disintegrate Immediate disintegration |
| 9 | 666 | 660 | 650 | 93 | 90 | 77 | Disintegration after 5 minutes |
| 10 | 665 | 661 | 642 | 91 | 92 | 63 | Disintegration after 30 seconds |

TABLE I-continued

| Example No. | Sum of all immediate | whiteness measurements after 3 weeks' storage | after 6 weeks' storage | % activation immediate | after 3 weeks' storage | after 6 weeks' storage | Rate of dissolution of the corresponding compactate |
|---|---|---|---|---|---|---|---|
| 11 | 667 | 645 | 621 | 94 | 61 | 25 | — |

The Examples which now follow illustrate the preferred triple combination of (a), (b) and (c).

Test of shelf life of the granular activators

1. Preparation of the test washing powder

A test washing powder is prepared by mixing a powder from a spray drying tower with 10% of a perborate and sufficient compounded cold bleaching activator to give 8% of 100% strength activator in the detergent, and then making up the complete detergent formulation with 33% of sodium sulfate. If a compounded cold bleaching activator is used, the dispersant therein is offset against the 33% of sodium sulfate.

After mixing, the test washing powder has the following composition:

| | |
|---|---|
| Alkylbenzenesulfonate | 10% |
| $C_{13}/C_{15}$ alkyl glycol ether (9 to 14 moles of ethylene oxide | 3% |
| Sodium tripolyphosphate | 30% |
| Magnesium silicate | 4% |
| Carboxymethylcellulose | 2% |
| Sodium perborate tetrahydrate | 10% |
| Cold bleaching activator, taken as 100% strength | 8% |
| $Na_2SO_4$ | 33% |

2. Storage test method 30 g portions of the washing powder mixture $W_x$, thus prepared, are stored in open Petri dishes in a controlled-climate cabinet at 40° C. and 76% relative atomspheric humidity. The bleaching action is determined immediately after mixing and after 21 days, 42 days and 84 days' storage. It is compared with the bleaching action of a powder mixture $W_o$ which contains $Na_2SO_4$ (no activation) instead of the cold bleaching activator, and with the same washing powder mixture to which, before each bleaching test, 8% of crystalline activator is freshly added ($W_{100}$) (Experiment 17 and 18).

Since the powder $W_o$ is also subjected to storage, the slight decomposition of the perborate has no effect on the relative test results, which essentially only indicate the hydrolysis of the activator.

3. Testing the bleaching action of the test washing powder (a) Test conditions:
Test apparatus: Launder-Ometer
Water hardness: 16° German hardness
Amount of Liquor: 250 ml
Liquor ratio: 1:12.5
Detergent concentration: 7 g/liter (b) Test fabrics:
10 g of greige cotton nettle (whiteness about 59%)
5 g of bleached cotton nettle soiled with red wine (whiteness about 70%)
5 g of bleached cotton nettle soiled with tea (whiteness about 54%)

The three different test fabrics, each washed for 30 minutes at room temperature, 30 minutes at 25°-45° C. and 30 minutes at 35°-60° C., are subjected to whiteness measurements, giving 9 values which are summed. As a result of this summing and of duplicate determination, the values obtained have a sufficient degree of reliability.

The whiteness measurements were carried out on an ELREPHO instrument from Zeiss, using Filter 8 and a xenon lamp with FL 46.

The difference in the sums of the whitenesses of $W_{100}$ and $W_o$ corresponds to 100% activation. The activation, in %, of a mixture is calculated from the formula $$\%\ \text{activation} = \frac{\Sigma W_x - \Sigma W_o \cdot 100}{\Sigma W_{100} - \Sigma W_o}$$

Here $\Sigma W_x$ is the sum of the whitenesses found with the detergent mixture $W_x$ and $\Sigma W_o$ and $\Sigma W_{100}$ are the sums of the whitenesses found with the two mixtures described above, having activation zero and 100%.

EXAMPLE 12

A mixture of 90 parts of tetraacetylethylenediamine (TAED) having a special particle size distribution (30% of 0-50 μm, 20% of 50-100 μm, 20% of 100-200 μm and 30% of 200 μm), 5 parts of corn starch and 5 parts of sodium tripolyphosphate is homogenized in a continuous Lödige mixer, and the mixture is fed to a roll press by means of a feed screw and compacted to give scabs, which are then comminuted in a hammer mill. Subsequent fractionation gives a useful fraction of particle size from 0.5 to 2 mm. Oversize and undersize material is recycled to the milling stage and compacting stage respectively.

The broken granules obtained are composed of 90 parts of TAED, 5 parts of corn starch and 5 parts of sodium tripolyphosphate, and this material, together with sodium perborate, and with or without sodium sulfate, is added to a detergent powder from a spray-drying tower, in amounts such as to give a washing powder which has the composition described on page 10.

Similarly to Example 12, compacting was effected with various amounts of assistants and additives. The product compositions obtained are shown in Examples 13 to 25 of Table II below.

TABLE II

| Example | Activator | Swelling agent | Dispersant |
|---|---|---|---|
| 13 | 85 parts of TAED | 5 parts of corn starch | 10 parts of Na salt of a maleic acid/acrylic acid copolymer of K value 45* |
| 14 | 90 parts of TAED | 5 parts of potato starch | 5 parts of Na nitrilotriacetate |

TABLE II-continued

| Example | Activator | Swelling agent | Dispersant |
|---|---|---|---|
| 15 | 95 parts of TAED | 2.5 parts of carboxy-methylcellulose | 2.5 parts of carboxymethylcellulose** |
| 16 | 85 parts of TAED | 5 parts of corn starch | 10 parts of sodium tripolyphosphate |
| 17 | 85 parts of TAED | 5 parts of corn starch | 10 parts of sodium sulfate |
| 18 | 80 parts of PAG | 15 parts of corn starch | 5 parts of carboxymethylcellulose |
| 19 | 80 parts of PAG | 10 parts of corn starch | 10 parts of sodium tripolypyosphate |
| 20 | 70 parts of PAG | 25 parts of corn starch | 5 parts of sodium tripolyphosphate |
| 21 | 80 parts of PAG | 15 parts of starch | 5 parts of a maleic acid/acrylic acid copolymer of K value 25* |
| 22 | 80 parts of PAG | 17.5 parts of corn starch | 2.5 parts of a maleic acid/acrylic acid copolymer of K value 40* |
| 23 | 80 parts of PAG | 15 parts of corn starch | 5 parts of polyacrylic acid, K value 50* |
| 24 | 70 parts of PAG | 25 parts of corn starch | 5 parts of methylhydroxyethylcellulose*** |
| 25 | 92.5 parts of PAG | 5 parts of corn starch | 2.5 parts of polyacrylic acid. K value 40 |

*measured in 2% strength aqueous solution
**Tylose CR
***Tylose MHB

The broken granules described in Examples 12 to 25 were then incorporated into a test washing powder, and tested for their activating effect, in accordance with the test method described earlier. The results were assesed in terms of the whiteness of the fabrics which had been soiled in various ways and washed at various temperatures. 100% whiteness was taken to be the whiteness achieved with a detergent (spray-dried powder + perborate)+ TAED, Example 28, and PAG, Example 29. The % activation after storage was calculated using the formula given earlier.

The activation data, in % based on the initial value (ie. without storage), of the washing powder + activator were measured after 21 days, 42 days and 84 days' storage.

TABLE III

| Example No. | Activator from Example No. | Before storage | % activation after 21 days | after 42 days | after 84 days |
|---|---|---|---|---|---|
| 26 | Example 2 of German Laid-Open Application DOS 2,855,777 | 98 | 62 | 27 | 0 |
| 27 | Example 1 of European Laid-Open Application 0,037,026 | 98 | 61 | 49 | 5 |
| 28 | — | 100 | 22 | 0 | 0 |
| 29 | — | 100 | 10 | 0 | 0 |
| 30 | 1 | 100 | 100 | 70 | 10 |
| 31 | 2 | 98 | 85 | 80 | 16 |
| 32 | 3 | 96 | 90 | 85 | 16 |
| 33 | 4 | 100 | 80 | 60 | 5 |
| 34 | 5 | 95 | 75 | 65 | 10 |
| 35 | 6 | 96 | 90 | 60 | 5 |
| 36 | 7 | 100 | 85 | 60 | 5 |
| 37 | 8 | 95 | 75 | 45 | 0 |
| 38 | 9 | 98 | 85 | 65 | 15 |

TABLE III-continued

| Example No. | Activator from Example No. | Before storage | % activation after 21 days | after 42 days | after 84 days |
|---|---|---|---|---|---|
| 39 | 10 | 97 | 85 | 65 | 15 |
| 40 | 11 | 100 | 85 | 70 | 12 |
| 41 | 12 | 98 | 80 | 65 | 8 |
| 42 | 13 | 98 | 85 | 75 | 14 |
| 43 | 14 | 97 | 65 | 35 | 0 |

An important factor in successful bleaching is rapid dispersion of the bleaching activator in the bleaching liquor.

Coarse cold bleaching activators have too small a surface area and moreover they can, under adverse conditions, namely if they deposit on the laundry, cooperate with the perborate to damage the fibers. For all these reasons, spontaneous dispersion of the agglomerates-whether they be mixer granules or compactates-in the wash liquor is essential.

Since the compactates are produced under high roll pressure whilst granules produced in mixers are merely agglomerated, it might have been expected that compactates are distinctly inferior to mixer granules in respect of dispersion in the washing liquor.

Surprisingly, the compactates described in the present text behave just as advantageously as mixer granules in respect of dispersion. They even have the advantage that the coarse components of the initial activator, namely of those 22 200 μm diameter, are crushed by compacting, ie. the coarse fraction is reduced.

Table IV gives the dispersion times and particle size distribution for some examples of products.

TABLE IV

| Example | Product employed Example No. | Assessment after 5 minutes stirring with a magnetic stirrer at 100 rpm | Particle size distribution compared to the fine powder employed |
|---|---|---|---|
| 44 | 1 | fully dispersed | Proportion >200 μm reduced from 30% to 20% |
| 45 | 5 | fully dispersed | Proportion >200 μm reduced from 30% to 20% |
| 46 | Example 2 of German Laid-Open Application DOS 2,855,777 | fully dispersed | No change |

We claim:

1. A process for the preparation of a granular bleaching activator, which comprises:

(a) homogeneously mixing the powdered components of said granular bleaching activator consisting of (1) from 75 to 95 parts by weight of at least one bleaching activator selected from the group consisting of pentaacetylglucose, pentapropionylglucose, tetraacetylethylenediamine, tetracetylglycoluril, carboxylic acid anhydrides, salts of mixed anhydrides and phenol esters, (2) from 2.5 to 15 parts by weight of at least one water-swellable assistant selected from the group consisting of starch, crosslinked polyvinylpyrrolidone and starch ethers, and (3) from 2.5 to 10 parts by weight of at least one inorganic or organic builder and/or dispersant selected from the group consisting of sodium sulfate, sodium carbonate, alkali metal salts or alkaline earth metal salts of phosphoric acid, oligomeric phosphoric acids, polymeric phosphoric acids, alkali metal salts or alkaline earth metal salts of nitrilotriacetic acid, alkali metal salts or alkaline earth metal salts of ethylenediaminetetraacetic acid, alkali metal salts or alkaline earth metal salts of polyacrylic acid, the alkali metal salts or alkaline earth metal salts of copolymers of maleic acid with acrylic acid or vinyl ethers, one of said organic acids in free form, and carboxymethylcellulose without the presence of water;

(b) compacting said mixture by feeding said mixture by means of a feed screw into the gap between two counterrotating rolls;

(c) comminuting the compactate obtained; and (d) isolating the particles of compactate obtained having a size ranging from 0.5 to 3 mm.

2. The process of claim 1, wherein said water-swellable assistant is crosslinked polyvinylpyrrolidone or a starch ether.

* * * * *